(12) United States Patent
Ding et al.

(10) Patent No.: US 10,627,935 B2
(45) Date of Patent: Apr. 21, 2020

(54) DISPLAY DEVICE, DRIVING METHOD THEREOF, AND ELECTRONIC DEVICE

(71) Applicants: BOE Technology Group Co., Ltd., Beijing (CN); Beijing BOE Optoelectronics Technology Co., Ltd., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Wei Liu, Beijing (CN); Weijie Zhao, Beijing (CN); Changfeng Li, Beijing (CN); Pengpeng Wang, Beijing (CN); Shengji Yang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 249 days.

(21) Appl. No.: 15/504,388

(22) PCT Filed: Aug. 3, 2016

(86) PCT No.: PCT/CN2016/093075
§ 371 (c)(1),
(2) Date: Feb. 16, 2017

(87) PCT Pub. No.: WO2017/063433
PCT Pub. Date: Apr. 20, 2017

(65) Prior Publication Data
US 2017/0235400 A1 Aug. 17, 2017

(30) Foreign Application Priority Data
Oct. 15, 2015 (CN) .......................... 2015 1 0666273

(51) Int. Cl.
*G06F 3/041* (2006.01)
*G06F 3/044* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS 9,285,913 B1 * 3/2016 Kang .................... G06F 3/0412
2011/0157043 A1 6/2011 Lai et al.
(Continued)

FOREIGN PATENT DOCUMENTS

CN 103399678 A 11/2013
CN 104199579 A 12/2014
(Continued)

OTHER PUBLICATIONS

Oct. 26, 2016—(WO) International Search Report and Written Opinion Appn PCT/CN2016/093075 with English Tran.

*Primary Examiner* — Christopher R Lamb
(74) *Attorney, Agent, or Firm* — Banner & Witcoff, Ltd.

(57) ABSTRACT

A display device and a driving method thereof, and an electronic device are provided. The display device includes: an array substrate and an opposing substrate arranged opposite to each other, a touch electrode pattern provided between the array substrate and the opposing substrate, a backlight module provided below the array substrate; and a counter electrode provided on the backlight module; the counter electrode and the touch electrode pattern forming a capacitive structure; in a touch detection period, a touch
(Continued)

detection signal is loaded onto the touch electrode pattern and the counter electrode at the same time, to determine a touch position; in a pressure detection period, a touch detection signal is loaded onto the touch electrode pattern or the counter electrode, to determine a magnitude of pressure in the touch position.

8 Claims, 3 Drawing Sheets

(51) Int. Cl.
*G02F 1/1333* (2006.01)
*G02F 1/1343* (2006.01)
*G02F 1/1362* (2006.01)
*G02F 1/1368* (2006.01)

(52) U.S. Cl.
CPC .. *G02F 1/134336* (2013.01); *G02F 1/136286* (2013.01); *G06F 3/044* (2013.01); *G06F 3/0416* (2013.01); *G06F 2203/04105* (2013.01)

(56) References Cited

U.S. PATENT DOCUMENTS

| | | | |
|---|---|---|---|
| 2013/0285971 A1* | 10/2013 | Elias | G06F 3/044 345/174 |
| 2015/0035790 A1* | 2/2015 | Mo | G06F 3/044 345/174 |
| 2015/0378512 A1* | 12/2015 | Choi | G06F 3/0418 345/174 |
| 2016/0041666 A1* | 2/2016 | Lee | G02F 1/13338 345/174 |
| 2016/0085336 A1* | 3/2016 | Kim | G06F 1/1643 345/174 |
| 2016/0092015 A1* | 3/2016 | Al-Dahle | G06F 3/044 345/174 |
| 2016/0334903 A1* | 11/2016 | Shepelev | G06F 3/044 |

FOREIGN PATENT DOCUMENTS

| | | |
|---|---|---|
| CN | 104423740 A | 3/2015 |
| CN | 104808876 A | 7/2015 |
| TW | 201447701 A | 12/2014 |

\* cited by examiner

DISPLAY DEVICE, DRIVING METHOD THEREOF, AND ELECTRONIC DEVICE

The application is a U.S. National Phase Entry of International Application No. PCT/CN2016/093075 filed on Aug. 3, 2016, designating the United States of America and claiming priority to Chinese Patent Application No. 201510666273.4, filed Oct. 15, 2015. The present application claims priority to and the benefit of the above-identified applications and the above-identified applications are incorporated by reference herein in their entirety.

TECHNICAL FIELD

Embodiments of the present disclosure relate to a display device, a driving method thereof, and an electronic device.

BACKGROUND

A pressure sensing technology refers to a technology capable of implementing detection on an external force, and this technology has been used in industrial control, medical and other fields a long time ago. At present, in the field of display, particularly in the field of a mobile phone or a tablet, pressure sensing is implemented in a way of adding an additional mechanism in a backlight portion of a liquid crystal display panel or a middle frame of a mobile phone; for the design, it is necessary to modify structure design of the liquid crystal display panel or the mobile phone; in addition, because an assembly tolerance is relatively great, detection accuracy of the design is also limited.

SUMMARY

Embodiments of the present disclosure provide a display device and a driving method thereof, for implementing touch detection and highly accurate pressure sensing detection in the display device.

An embodiment of the present disclosure provides a display device, comprising: an array substrate and an opposing substrate arranged opposite to each other, a touch electrode pattern provided between the array substrate and the opposing substrate, a backlight module provided below the array substrate; and a counter electrode provided on the backlight module; the counter electrode and the touch electrode pattern form a capacitive structure; in a touch detection period, a touch detection signal is loaded onto the touch electrode pattern and the counter electrode at the same time, to determine a touch position by detecting a change in a capacitance value of the respective touch electrode pattern; in a pressure detection period, a touch detection signal is loaded onto the touch electrode pattern or the counter electrode, to determine a magnitude of pressure in the touch position by detecting a change in a capacitance value between the touch electrode pattern and the counter electrode.

For example, in some examples of the display device, the counter electrode is provided on a side surface or a back surface of the backlight module adjacent to the array substrate.

For example, in some examples of the display device, in the touch detection period, an electrical signal the same as the touch detection signal is loaded onto a gate line and a data line in the array substrate.

For example, in some examples of the display device, in the pressure detection period, the touch detection chip is specifically configured for loading the touch detection signal onto the touch electrode pattern, and at the same time, loading a fixed value signal onto the counter electrode.

For example, in some examples of the display device, in the pressure detection period, an electrical signal the same as the touch detection signal is loaded onto a gate line and a data line in the array substrate.

For example, in some examples of the display device, in the pressure detection period, the touch detection chip is specifically configured for loading the touch detection signal onto the counter electrode, and at the same time, loading a fixed value signal onto the touch electrode pattern.

For example, in some examples of the display device, in the pressure detection period, the fixed value electrical signal is loaded onto a gate line and a data line in the array substrate.

For example, in some examples of the display device, the respective touch electrode pattern constitutes a common electrode layer on the array substrate.

For example, in some examples of the display device, the counter electrode is a metal frame provided outside the backlight module, or a metal patch attached to the back surface of the backlight module.

For example, the display device further comprises an outer attached layer provided on an outer side of the backlight module, and the outer attached layer is adjacent to the counter electrode provided on the back surface of the backlight module.

Another embodiment of the present disclosure provides a driving method of the display device, and the method comprises: in a touch detection period, loading a touch detection signal onto a touch electrode pattern and a counter electrode at the same time, to determine a touch position by detecting a change in a capacitance value of the respective touch electrode pattern; in a pressure detection period, loading a touch detection signal onto the touch electrode pattern or the counter electrode, to determine a magnitude of pressure in the touch position by detecting a change in a capacitance value between the touch electrode pattern and the counter electrode.

For example, in some examples, the driving method further comprises: in the touch detection period, loading an electrical signal the same as the touch detection signal onto a gate line and a data line in the array substrate.

For example, in some examples of the driving examples, loading of a touch detection signal onto the touch electrode pattern or the counter electrode includes: in the pressure detection period, loading a touch detection signal onto the touch electrode pattern, and at the same time, loading a fixed value signal onto the counter electrode.

For example, in some examples, the driving method further comprises: in the pressure detection period, loading an electrical signal the same as the touch detection signal onto the gate line and the data line in the array substrate.

For example, in some examples of the driving examples, loading of a touch detection signal onto the touch electrode pattern or the counter electrode includes: in the pressure detection period, loading a touch detection signal onto the counter electrode, and at the same time, loading a fixed value signal onto the touch electrode pattern.

For example, in some examples, the driving method further comprises: in the pressure detection period, loading the fixed value electrical signal onto the gate line and the data line in the array substrate.

Still another embodiment of the present disclosure provides an electronic device, comprising any of the above-described display devices.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventors have made research to solve the problem of how to implement pressure sensing with highly accurate precision in the case where a minor change is made to hardware of a display panel.

Figure 1:
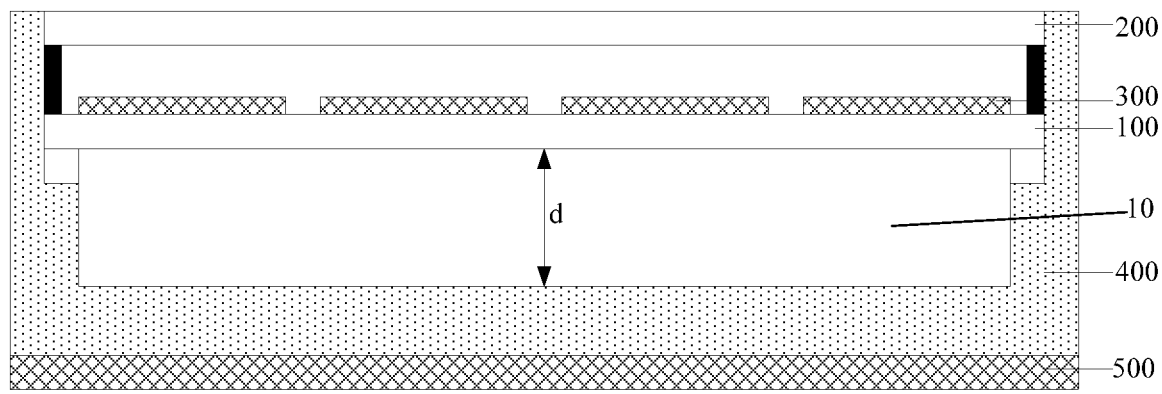
FIG. 1 is a structural schematic diagram of a display device provided by an embodiment of the present disclosure.

An embodiment of the present disclosure provides a display device, as illustrated in FIG. 1, the display device comprising an array substrate 100 and an opposing substrate 200 arranged opposite to each other, and a self-capacitive electrode 300 provided between the array substrate 100 and the opposing substrate 200. The display device further comprises: a backlight module 400 provided below the array substrate 100, and a backlight metal 500 formed on a back surface of the backlight module 400. The backlight metal 500 and the self-capacitive electrode 300 are arranged opposite to each other, and a capacitive structure can be formed therebetween.

The self-capacitive electrode 300 is an example of a touch electrode pattern, including a plurality of electrodes arranged in an array, and each electrode may, for example, be individually addressed and detected, and for example, be made of a transparent conductive material such as Indium Tin Oxide (ITO). The backlight metal 500 is an example of a counter electrode, which may be formed through the entire surface or may be formed, for example, as a plurality of strip electrodes parallel to each other, corresponding to the above-described touch electrode pattern, and there is an interval between the strip electrodes. The counter electrode is not limited to the case of being made of a metal material, but may be made of, for example, a conductive material such as ITO.

For example, the array substrate 100 includes a plurality of gate lines and a plurality of data lines, these gate lines and data lines intersect with each other and thereby define a plurality of pixel units arranged in a matrix, and each pixel unit includes a thin film transistor as a switching element, and a pixel electrode and a common electrode for controlling an arrangement direction of a liquid crystal.

A touch detection chip is further included to, in a touch detection period, load a touch detection signal onto the self-capacitive electrodes 300 and the backlight metal 500 at the same time, to determine a touch position by detecting a change in capacitance values of the respective self-capacitive electrodes 300, and in a pressure detection period, load a touch detection signal onto the self-capacitive electrode 300 or the backlight metal 500, to determine a magnitude of pressure by detecting a change in capacitance values of the self-capacitive electrode 300.

The display device provided by the embodiment of the present disclosure, implements a function of pressure sensing by using the capacitive structure formed between the self-capacitive electrode 300 and the backlight metal 500 in a touch screen, so that a minor change is made to the structure design of the display device, and it will not be limited by an assembly tolerance, which is advantageous to achieve better detection accuracy, and advantageous to save production costs.

In the above-described display device provided by the embodiment of the present disclosure, as illustrated in FIG. 1, there is an air gap 10 with a distance d between a touch screen including the array substrate 100 and the opposing substrate 200 and the backlight module 400 located below the touch screen. When the touch screen is pressed, the air gap 10 is compressed so that the distance d is reduced, and thus the capacitance formed between the self-capacitive electrode 300 and the backlight metal 500 in the touch screen increases; and by detection of the change of the capacitance value, the magnitude of the pressure can be determined.

Figure 2:
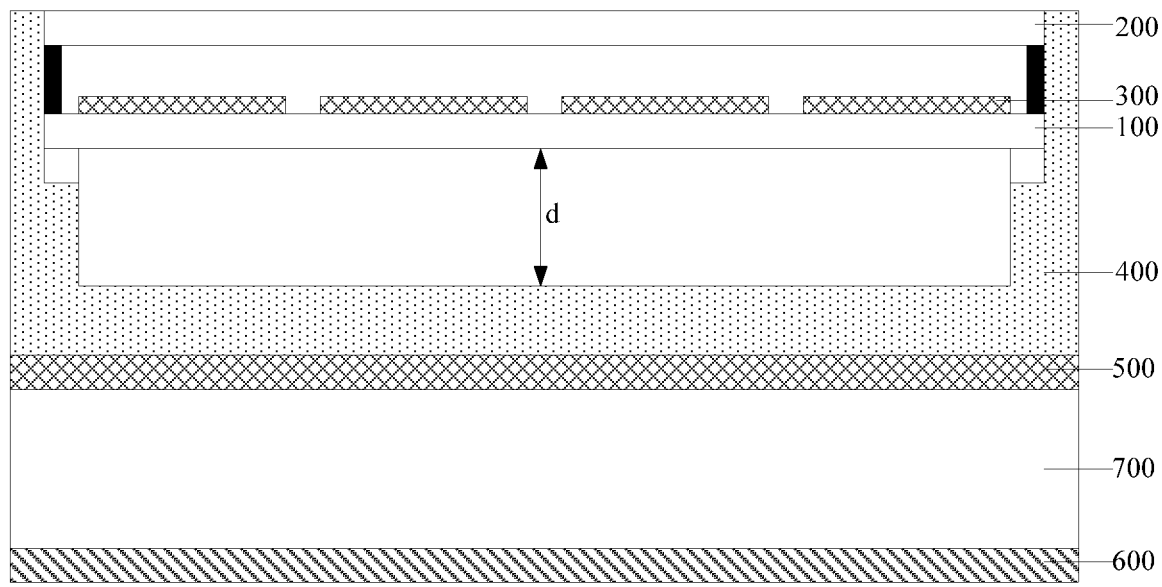
FIG. 2 is a structural schematic diagram of a display device provided by another embodiment of the present disclosure.

For example, in the above-described display device provided by the embodiment of the present disclosure, in order to prevent the case that the backlight metal 500 on a back surface of the backlight module 400 is deformed, when the touch screen is pressed, resulting in that part of the pressure is passed but not entirely embodied in reduction of the distance d of the air gap, as illustrated in FIG. 2, in the display device according to another embodiment, for example, a support layer 700 may be filled between a middle frame 600 of an electronic device (e.g., a mobile phone) outside the backlight module 400 and the backlight metal 500 of the backlight module 400, the support layer 700 and the backlight metal 500 provided on the back surface of the backlight module 400 are arranged adjacent to each other, to support the backlight metal 500 so as to avoid deformation of the backlight metal. The support layer 700 is preferably made of an insulating material of high hardness, such as PET or PC. The support layer 700 is an example of an outer attached layer.

For example, in the above-described display device provided by the embodiment of the present disclosure, the backlight metal 500 which forms the capacitive structure with the self-capacitive electrode 300 may be, for example, a metal frame coated outside the backlight module 400, or may also be a metal patch attached to the back surface of the backlight module 400, which will not be limited here.

Figure 6:
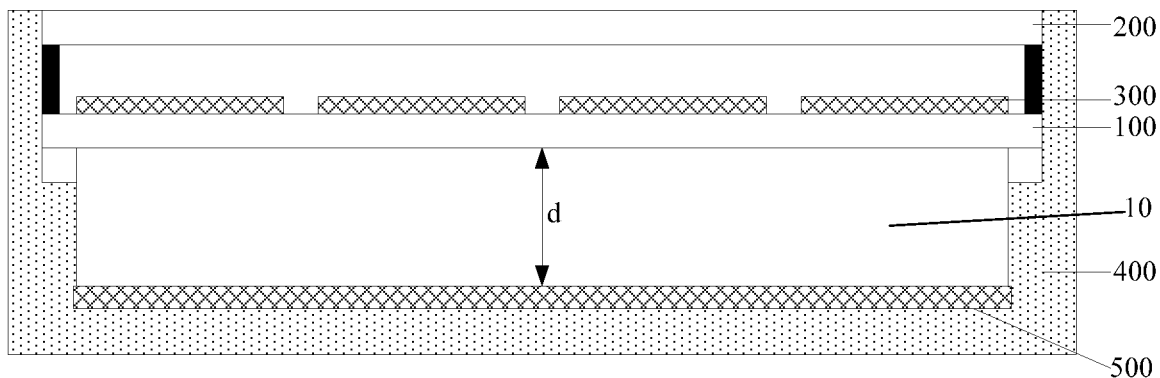
FIG. 6 is a structural schematic diagram of a display device provided by still another embodiment of the present disclosure.

FIG. 6 shows a display device provided by still another embodiment of the present disclosure, this embodiment differs from the embodiment illustrated in FIG. 1 in that the counter electrode arranged opposite to the capacitive electrode 300 is not provided on the back surface of the backlight module 400, but is provided on a side where the backlight module 400 is adjacent to the array substrate 100, and still includes the air gap 10 with a distance d between the touch screen, including the array substrate 100 and the opposing substrate 200, and the backlight module 400 located below the touch screen.

A specific structure of the self-capacitive electrode 300 in the above-described display device provided by the embodiment of the present disclosure may be implemented in various ways. For example, the common electrode layer in the array substrate 100 may be multiplexed as the self-capacitive electrodes 300, i.e., the respective self-capacitive electrodes 300 constitute the common electrode layer on the array substrate. When the structure of the common electrode layer is changed and divided to form self-capacitive electrodes, for a preparation process of the array substrate, it is not necessary to add an additional process, which can save the production cost and improve production efficiency. For example, the respective self-capacitive electrodes 300 may also be separately formed independent of the common electrode layer in the array substrate, for example, prepared on a stacked structure of the array substrate.

Hereinafter, with the common electrode layer being multiplexed as the self-capacitive electrodes 300 as an example, a specific mode of how the above-described display device provided by the embodiment of the present disclosure implements touch detection and pressure sensing will be introduced in detail.

In the above-described display device provided by an embodiment of the present disclosure, for example, in order to reduce mutual interference between display signal and touch signal, it is necessary to use a time-sharing driving mode in a touch stage and a display stage. For example, a display driver chip and a touch detection chip can also be integrated into one chip, to further reduce the production cost.

Figure 3:
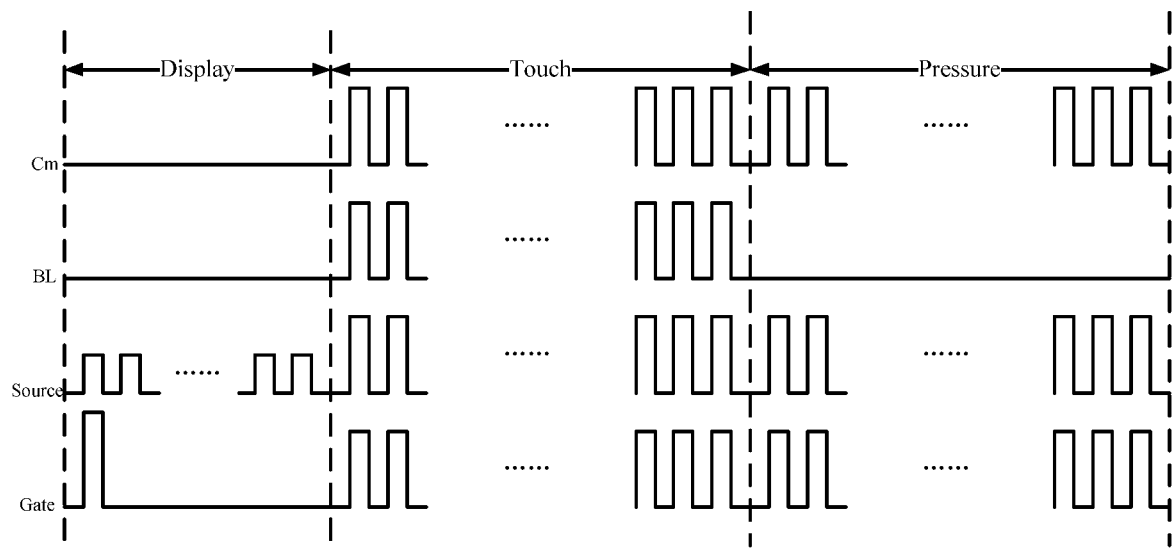
FIG. 3 and FIG. 4 are schematic diagrams of driving timing of a display device provided by an embodiment of the present disclosure.
Figure 4:
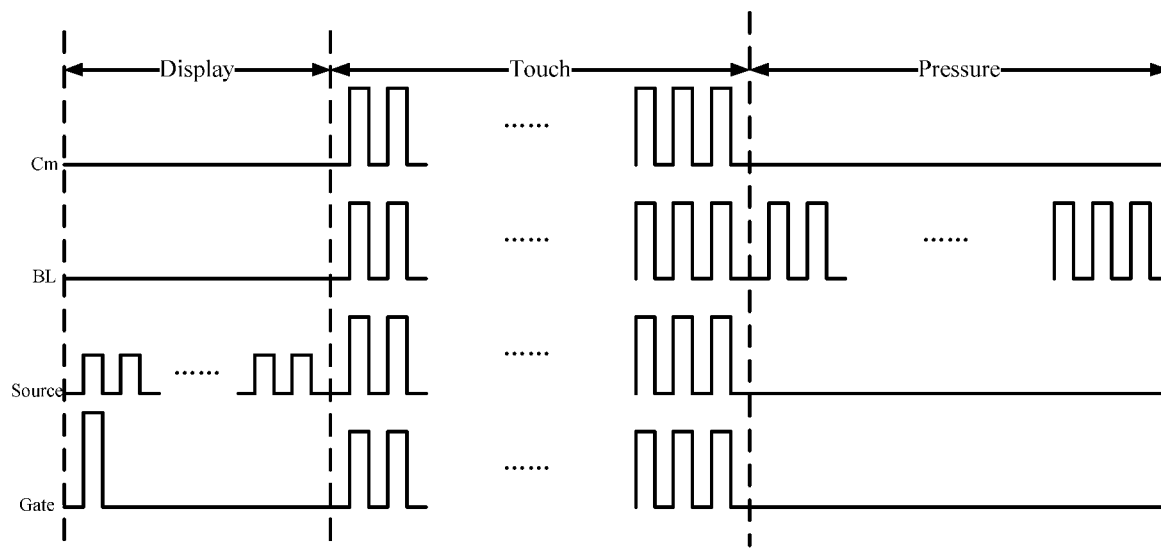

In diagrams of driving timing as illustrated in FIG. 3 and FIG. 4, the time of each frame (V-sync) in the display device is generally divided into a display period (Display), a touch detection period (Touch), and a pressure detection period (Force).

In the display period (Display), as illustrated in FIG. 3 and FIG. 4, a gate scanning signal is sequentially loaded onto each gate signal line Gate in the display device, and a gray scale signal is loaded onto each data signal line Source; when the common electrode layer is multiplexed as self-capacitive electrodes Cm, the touch detection chip connected with the self-capacitive electrodes Cm respectively loads a common electrode signal onto the respective self-capacitive electrodes Cm, to implement a liquid crystal display function. At this time, the touch detection chip connected with the backlight metal BL will also apply a common electrode signal to the backlight metal BL.

In the touch detection period (Touch), as illustrated in FIG. 3 and FIG. 4, the touch detection chip simultaneously loads the touch detection signal onto the self-capacitive electrode Cm and the backlight metal BL. At this time, a change in the distance between the self-capacitive electrode Cm and the backlight metal BL caused by touch press does not bring about charge-discharge of the capacitive structure formed therebetween, that is, does not affect the detection signal on the self-capacitive electrode Cm. Therefore, according to a detection principle of self-capacitance, the touch position can be determined by detecting the change in the capacitance value of the respective self-capacitive electrodes Cm, so as to implement the touch detection function.

Further, in the touch detection period (Touch), in order to avoid generation of ground capacitance between the gate line Gate, as well as the data line Source in the array substrate, and the self-capacitive electrode Cm, which thus affects accuracy of touch detection, as illustrated in FIG. 3 and FIG. 4, an electrical signal the same as the touch detection signal can be loaded onto the gate line Gate and the data line Source in the array substrate in the touch detection period, which thus can eliminate the ground capacitance between the gate line Gate as well as the data line Source and the self-capacitive electrode Cm, and facilitate improving accuracy of touch detection.

In the pressure detection period (Force), the touch detection chip loads the touch detection signal onto the self-capacitive electrode Cm, or onto the backlight metal BL, at this time, the change in the distance between the self-capacitive electrode Cm and the backlight metal BL caused by touch press will bring about charge-discharge of the capacitive structure formed therebetween, that is, affect the detection signal on the self-capacitive electrode, and thus, the magnitude of pressure in the touch position can be determined by detecting the change in the capacitance value of the self-capacitive electrode, so as to implement the pressure sensing function.

For example, in the pressure detection period (Force), there may be two modes below for the touch detection chip to load the signal onto the self-capacitive electrode or the backlight metal:

A first mode is as illustrated in FIG. 3. In the pressure detection period, the touch detection chip loads the touch detection signal onto the self-capacitive electrode Cm, and at the same time, loads a fixed value signal onto the backlight metal BL; that is, a level of the backlight metal BL is relatively fixed at this time. In this way, the change in the distance between the self-capacitive electrode Cm and the backlight metal BL caused by touch press will bring about charge-discharge of the capacitive structure formed therebetween, impact caused by the charge-discharge procedure will be counted in a detection signal amount of the self-capacitive electrode; it is assumed that a detection signal amount obtained at this time is "b," and in the touch detection period (Touch), according to the detection principle of self-capacitance, it is assumed that a detection signal amount of the self-capacitive electrode detected by the capacitance generated between a finger and the self-capacitive electrode is "a," then a detection signal amount generated due to the pressure is f=b−a. The greater value of f indicates a greater pressure value, and a pressure value can be determined in the above-described mode.

Further, in the first mode, in order to avoid generation of ground capacitance between the gate line Gate as well as the data line Source in the array substrate and the self-capacitive electrode Cm in the pressure detection period so that accuracy of pressure sensing is affected, when specifically implemented, as illustrated in FIG. 3, in the pressure detection period, an electrical signal the same as the touch detection signal can be loaded onto the gate line Gate and the data line Source in the array substrate, which thus can eliminate the ground capacitance between the gate line Gate as well as the data line Source and the self-capacitive electrode Cm, and facilitate improving accuracy of pressure sensing.

A second mode is as illustrated in FIG. 4. In the pressure detection period, the touch detection chip loads the touch detection signal onto the backlight metal BL, and at the same time, loads a fixed value signal onto the self-capacitive electrode Cm; that is, a level of the self-capacitive electrode Cm is relatively fixed at this time. In this way, the change in the distance between the self-capacitive electrode Cm and the backlight metal BL caused by touch press will bring about charge-discharge of the capacitive structure formed therebetween; according to the detection principle of self-capacitance, by detecting a signal change amount of the self-capacitive electrode Cm, the capacitance value between the self-capacitive electrode and the backlight metal can be determined, so as to calculate the magnitude of the pressure.

Further, in the second mode, in order to avoid generation of ground capacitance between the gate line Gate as well as the data line Source in the array substrate and the self-capacitive electrode Cm in the pressure detection period so that accuracy of pressure sensing is affected, when specifically implemented, as illustrated in FIG. 4, in the pressure detection period, an electrical signal of a fixed value can be loaded onto the gate line Gate and the data line Source in the array substrate, which thus can eliminate the ground capacitance between the gate line Gate as well as the data line Source and the self-capacitive electrode Cm, and facilitate improving accuracy of pressure sensing.

Figure 5:
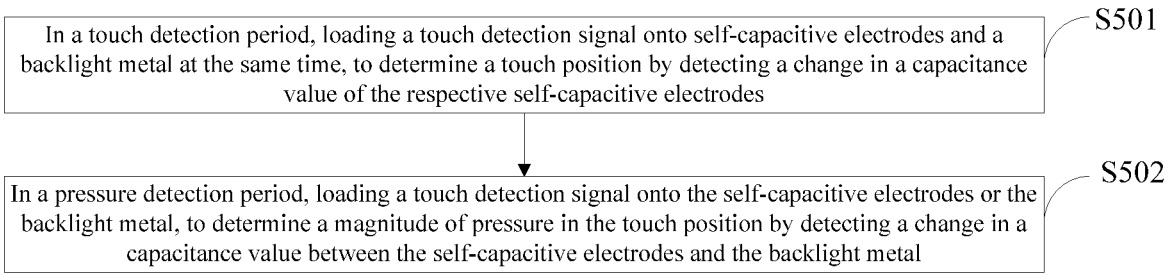
FIG. 5 is a flow schematic diagram of a driving method of a display device provided by an embodiment of the present disclosure.

Based on a same inventive concept, an embodiment of the present disclosure further provides a driving method of the above-described display device, as illustrated in FIG. 5, the method comprises steps of:

S501: in a touch detection period, loading a touch detection signal onto self-capacitive electrodes and a backlight metal at the same time, to determine a touch position by detecting a change in a capacitance value of the respective self-capacitive electrodes; and S502: in a pressure detection period, loading a touch detection signal onto the self-capacitive electrodes or the backlight metal, to determine a magnitude of pressure in the touch position by detecting a change in a capacitance value between the self-capacitive electrodes and the backlight metal.

For example, in the driving method of the above-described display device provided by the embodiment of the present disclosure, when step S501 is executed, a step below may be further executed: loading an electrical signal the same as the touch detection signal onto a gate line and a data line in the array substrate in the touch detection period. In this way, the ground capacitance between the gate line as well as the data line and the self-capacitive electrode can be eliminated, which is advantageous to improve accuracy of touch detection.

For example, in the driving method of the above-described display device provided by the embodiment of the present disclosure, in step S502: loading a touch detection signal onto a self-capacitive electrode or a backlight metal, for example, an implementation mode is: in the pressure detection period, loading a touch detection signal onto a self-capacitive electrode, and at the same time, loading a fixed value signal onto the backlight metal.

Further, in the driving method of the above-described display device provided by the embodiment of the present disclosure, when step S502 is implemented in the above-described mode, it may further include a step of: in the pressure detection period, loading an electrical signal the same as the touch detection signal onto the gate line and the data line in the array substrate. In this way, it is possible to eliminate the ground capacitance between the gate line as well as the data line and the self-capacitive electrode, which is advantageous to improve accuracy of pressure sensing.

For example, in the driving method of the above-described display device provided by the embodiment of the present disclosure, in step S502: in the pressure detection period, loading a touch detection signal onto the self-capacitive electrode or the backlight metal, for example, another implementation mode is: loading a touch detection signal onto the backlight metal, and at the same time, loading a fixed value signal onto the self-capacitive electrode.

Further, in the driving method of the above-described display device provided by the embodiment of the present disclosure, when step S502 is implemented in the above-described mode, it may further include a step of: in the pressure detection period, loading an electrical signal of a fixed vale onto the gate line and the data line in the array substrate. In this way, it is possible to eliminate the ground capacitance between the gate line and the data line and the self-capacitive electrode, which is advantageous to improve accuracy of pressure sensing.

The display device and the driving method thereof as described above provided by the embodiments of the present disclosure, comprise the array substrate and the opposing substrate arranged opposite to each other, and the self-capacitive electrode provided between the array substrate and the opposing substrate, and the backlight module provided below the array substrate; the backlight metal and the self-capacitive electrode form a capacitive structure. In the touch detection period, the touch detection signal is simultaneously loaded onto the self-capacitive electrode and the backlight metal, at this time, the change in the distance between the self-capacitive electrode and the backlight metal caused by touch press does not bring about charge-discharge of the capacitive structure formed therebetween, that is, does not affect the detection signal on the self-capacitive electrode, and therefore, according to the detection principle of self-capacitance, the touch position can be determined by detecting the change in the capacitance value of the respective self-capacitive electrodes, so as to implement the touch detection function. In the pressure detection period, the touch detection signal is loaded onto the self-capacitive electrode or the backlight metal, at this time, the change in the distance between the self-capacitive electrode and the backlight metal caused by touch press will bring about charge-discharge of the capacitive structure formed therebetween, that is, affect the detection signal on the self-capacitive electrode, and thus, the magnitude of pressure in the touch position can be determined by detecting the change in the capacitance value of the self-capacitive electrode, so as to implement the pressure sensing function. The above-described display device provided by the embodiment of the present disclosure, implements the function of pressure sensing by using the capacitive structure formed between the self-capacitive electrode and the backlight metal in the touch screen, so that a minor change is made to the structure design of the display device, and it will not be limited by an assembly tolerance, which is advantageous to achieve better detection accuracy, and advantageous to save production costs.

Still another embodiment of the present disclosure provides an electronic device, the electronic device comprising any one of the above-described display devices. The electronic device may be a mobile phone, a tablet personal computer, a television, a monitor, a laptop, a digital photo frame, a navigator, and any other product or component having a display function.

What are described above is related to the illustrative embodiments of the disclosure only and not limitative to the scope of the disclosure; the scopes of the disclosure are defined by the accompanying claims.

The application claims priority to the Chinese patent application No. 201510666273.4, filed Oct. 15, 2015, the entire disclosure of which is incorporated herein by reference as part of the present application.

What is claimed is:

1. A display device, comprising:
   an array substrate and an opposing substrate arranged opposite to each other;
   a touch electrode pattern provided between the array substrate and the opposing substrate;
   a backlight module provided on a side of the array substrate away from the opposing substrate;
   a counter electrode provided on the backlight module, the counter electrode and the touch electrode pattern forming a capacitive structure; and
   a touch detection chip,
   wherein, in a touch detection period, a touch detection signal is loaded onto the touch electrode pattern and the counter electrode at the same time, to determine a touch position by detecting a change in the capacitance value of the touch electrode pattern, and an electrical signal that is the same as the touch detection signal is loaded onto a gate line and a data line in the array substrate; and in a pressure detection period, the touch detection signal is loaded onto the touch electrode pattern or the counter electrode, to determine a magnitude of pressure in the touch position by detecting a change in a capacitance value between the touch electrode pattern and the counter electrode
   wherein the counter electrode is provided on a side surface or on a back surface of the backlight module adjacent to the array substrate, and,
   in the pressure detection period, the touch detection chip is specifically configured for loading the touch detection signal onto the touch electrode pattern, and at the same time, loading a fixed value onto the counter electrode.

2. The display device according to claim 1, wherein, in the pressure detection period, the electrical signal the same as the touch detection signal is loaded onto the gate line and the data line in the array substrate.

3. The display device according to claim 1, wherein the touch electrode pattern constitutes a common electrode layer on the array substrate.

4. The display device according to claim 1, wherein the counter electode is a metal frame provided outside of the backlight module, or a metal patch attached to a back surface of the backlight module.

5. The display device according to claim 1, wherein the counter electrode is provided on the back surface of the backlight module, the display device further comprising: an outer attached layer provided on an outer side of the backlight module,
   wherein the outer attached layer is adjacent to the couter electrode.

6. An electronic deveice, comprising the display device according to claim 1.

7. A display device, comprising:
   an array substrate and an opposing substrate arranged opposite to each other;
   a touch electrode pattern provided between the array substrate and the opposing substrate;
   a backlight module provided on a side of the array substrate away from the opposing substrate;
   a counter electrode provided on the backlight module, the counter electrode and the touch electrode pattern forming a capacitive structure; and
   a touch detection chip,
   wherein, in a touch detection period, a touch detection signal is loaded onto the touch electrode pattern and the counter electrode at the same time, to determine a touch position by detecting a change in the capacitance value of the touch electrode pattern, and an electrical signal that is the same as the touch detection signal is loaded onto a gate line and a data line in the array substrate; and in a pressure detection period, the touch detection signal is loaded onto the touch electrode pattern or the counter electrode, to determine a magnitude of pressure in the touch position by detecting a change in the capacitance value between the touch electrode pattern and the counter electrode,
   wherein, in the pressure detection period, the touch detection chip is specifically configured for loading the touch detection signal onto the counter electrode, and at the same time, loading a fixed value signal onto the touch electrode pattern.

8. The display device according to claim 7, wherein, in the pressure detection period, the fixed value signal is loaded onto the gate line and the data line in the array substrate.

* * * * *